United States Patent [19]

Watanabe et al.

[11] Patent Number: 4,660,057
[45] Date of Patent: Apr. 21, 1987

[54] HEATER POWER CONTROLLER FOR INK JET PRINTER

[75] Inventors: Masato Watanabe, Hachioji; Yasuhiko Tanaka, Fuchu; Kiyotaka Murakami, Hino, all of Japan

[73] Assignee: Konishiroku Photo Industry Co., Ltd., Tokyo, Japan

[21] Appl. No.: 838,442

[22] Filed: Mar. 10, 1986

Related U.S. Application Data

[63] Continuation of Ser. No. 571,847, Jan. 18, 1984, abandoned.

[30] Foreign Application Priority Data

Jan. 21, 1983 [JP]  Japan ................................ 58-8291

[51] Int. Cl.⁴ ........................ G01D 15/18; H05B 1/02
[52] U.S. Cl. ............................... 346/140 R; 346/75; 219/497; 219/501
[58] Field of Search ............... 346/140 IJ, 140 PD, 346/75; 219/302–305, 497, 501

[56] References Cited

U.S. PATENT DOCUMENTS

| | | | |
|---|---|---|---|
| 3,999,190 | 12/1976 | Brown et al. | 346/140 IJ |
| 4,093,847 | 6/1978 | Walker et al. | 219/501 |
| 4,223,207 | 9/1980 | Chow | 219/497 X |
| 4,314,143 | 2/1982 | Bilstad et al. | 219/497 |
| 4,459,469 | 7/1984 | Ishima | 219/497 |

Primary Examiner—George H. Miller, Jr.
Attorney, Agent, or Firm—Jordan B. Bierman

[57] ABSTRACT

A heater power controller for an ink jet printer wherein the output of a comparator making a comparison between a detection signal of the temperature of an ink in a print head of the ink jet printer and a reference signal is chopped by a clock having a predetermined period so as to be converted into a chopper signal, by which the supply of the power to a heating means provided in the head is controlled. A regulating device for regulating the duty ratio of the chopper signal is provided. Each of pulses constituting the chopper signal is made out of phase with a pulse supplied to other pulse-driven load.

3 Claims, 11 Drawing Figures

PRIOR ART  F I G. 1
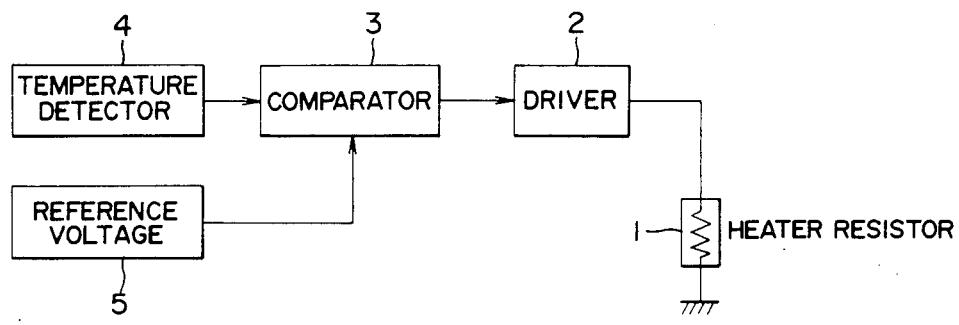
F I G. 2 (a)
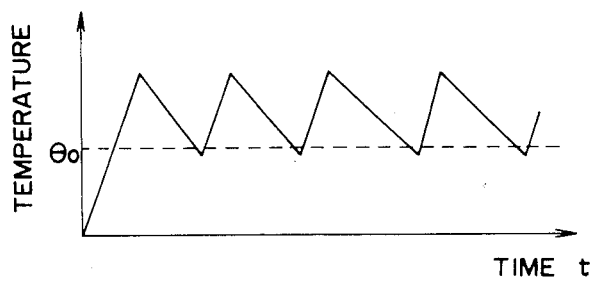
F I G. 2 (b)
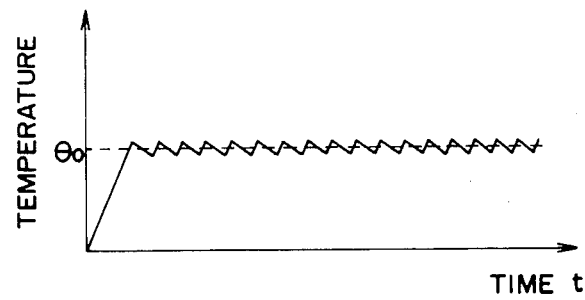

FIG. 3
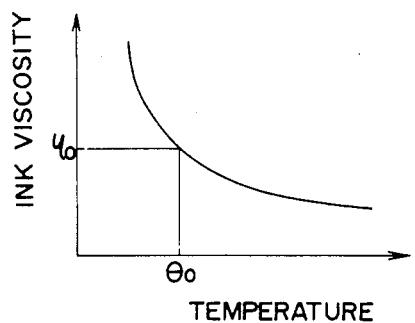
PRIOR ART  FIG. 4
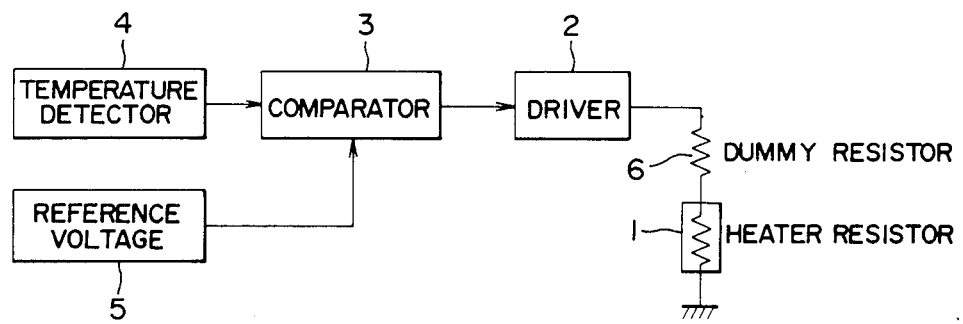
FIG. 5
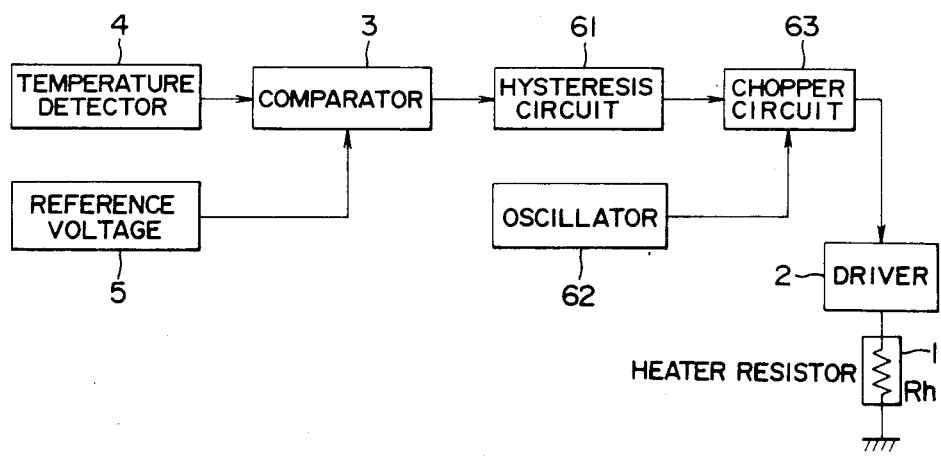

HEATER POWER CONTROLLER FOR INK JET PRINTER

This application is a continuation of application Ser. No. 571,847, filed 1/18/84, now abandoned.

BACKGROUND OF THE INVENTION

1. Field of the Invention

The present invention relates to a heater power controller for controlling the temperature of the ink in the print head of an ink jet printer.

2. Description of the Prior Art

An example of a conventional heater power controller of this kind is shown in FIG. 1. In the drawing, a heater resistor 1 is for heating the ink in the ink chamber in a print head for an ink jet printer. The heater resistor 1 is adapted to be driven (supplied with a current) by means of a driver 2. On the other hand, the driver 2 is energized by means of an ON-OFF control signal delivered from a comparator 3. A temperature detector 4 is adapted to detect the temperature of the ink to be heated. The comparator 3 makes a comparison between the output (a voltage signal corresponding to the ink temperature) of the temperature detector 4 and the output (a voltage corresponding to a predetermined ink temperature) of a reference voltage generator 5 and delivers an ON signal ("1" signal) when the former is smaller than the latter, i.e., when the ink temperature has not risen to the predetermined temperature, and an OFF signal ("0" signal) when the former is larger than the latter to the contrary.

Such a problem, however, has been encountered when the heater resistor is made by printing a print resistor on a head base that the stability of print resistor is lowered due to the materials thereof and the resistance value thereof is varied widely such as from 20Ω to 100Ω, for example. Accordingly, even if a constant voltage is applied on the heater resistor the heating temperature of the heater resistor is varied, thereby causing the head to be overheated, for example. Specifically, if the electric power applied on the heater is excessive the control ability of the heater temperature becomes wrong as shown in FIG. 2(a). The heater temperature is not stabilized at a setting temperature $\theta_0$ in cooperation with the hysteresis in the control system or the transmission delay from the heater to the sensor, so that a large overshoot is generated. Accordingly, the ink temperature in the nozzle becomes unsteady. The fluctuation (ripple) in temperature should be suppressed as shown in FIG. 2(b).

FIG. 3 is a graph showing a relation between the ink viscosity and the temperature. In the graph, the abscissa shows the temperature, the ordinate shows the viscosity of ink, and $\epsilon_0$ shows the ink viscosity at the temperature $\theta_0$. The viscosity of ink affects on the property of ink jet from the nozzle. If the temperature of nozzle is varied as shown in FIG. 2(a), the viscosity of ink is varied in the large extent at the value of $\epsilon_0$, so that the speed of ink droplets becomes unstable extremely, and if it is varied as shown in FIG. 2(b), the speed becomes stable.

Further, if the temperature of head is varied as shown in FIG. 2(a), the ink oozes out of the nozzle hole of head on the nozzle surface, because the ink is larger in coefficient of heat expansion than the head base plate. Specifically, if the temperature is elevated the ink is expanded and oozes out of the nozzle and if the temperature is lowered the ink is sucked into the nozzle and such phenomenon may be repeated. Large quantity of oozed ink causes the printing paper arranged in the viscosity of the nozzle surface to be soiled. Even if the printing is being carried out by jetting the droplets in the state that the ink oozes out, the oozed droplets in front of the nozzle prevent the droplet to be flown and air bubble are sucked into the nozzle, so that the reliability becomes lowered.

In such a conventional apparatus, accordingly, to cope with variations in resistance of the heater resistor 1, the dummy resistor 6 is connected in series to the heater resistor 1 to regulate the resistance value of the heater resistor 1 as shown in FIG. 4, thereby to consume unnecessary power in the dummy resistor and to drive the heater resistor 1 with a constant power. In this case, a dummy resistor usable to this object becomes very large in size and high in cost and many kinds of dummy resistors must be prepared according to the value of heater resistor, thereby causing the printer complicated in construction. In addition, the power consumed in the dummy resistor becomes wasteful heat losses and the temperature in the printer case becomes high, disadvantageously.

SUMMARY OF THE INVENTION

The present invention has been accomplished to overcome these problems of the prior art.

Accordingly, it is an object of the invention to provide a heater power controller having no heat loss and capable of supplying a constant power to the heater resistor even if there are considerable variations in the resistance value of the heater resistor.

It is another object of the invention to provide a heater power controller capable of speedily effecting a warm-up at a low temperature.

To these ends, according to the invention, there is provided a heater power controller for an ink jet printer wherein the temperature of an ink in a print head in the ink jet printer is detected to control the supply of a power to a heating means provided in the head according to the detection signal, characterized in that the output of a comparator making a comparison between the detection signal and a reference signal is chopped by means of a clock having a predetermined period so as to be converted into a chopper signal, by which the supply of the power to the heating means is controlled.

The above and other objects, features and advantages of the invention will become clear from the following description of the preferred embodiment thereof taken in conjunction with the accompanying drawings.

BRIEF DESCRIPTION OF THE DRAWINGS

FIG. 1 and FIG. 4 show the arrangements of examples of a conventional heater power controller;

FIG. 2(a) and FIG. 2(b) are graphs showing the variation of ink temperature in the head with time;

FIG. 3 is a graph showing the thermal property of the ink viscosity;

FIG. 5 shows the arrangement of one embodiment of the heater power controller in accordance with the invention;

DESCRIPTION OF THE PREFERRED EMBODIMENTS

Figure 6:
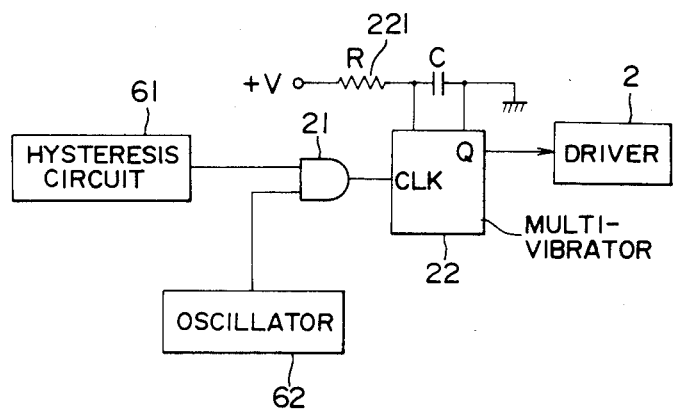
FIG. 6 is a circuit diagram showing in detail the chopper circuit portion of the heater power controller shown in FIG. 5.

FIG. 5 shows the arrangement of one embodiment of the heater power controller in accordance with the invention. The arrangement shown in FIG. 5 differs from that shown in FIG. 1 in that a hysteresis circuit 61, an oscillator 62 and a chopper circuit 63 are interposed between the comparator 3 and the driver 2 and that only the heater resistor 1 is directly connected to the output end of the driver 2 without using any dummy resistor. More specifically, in the heater power controller in accordance with the invention, the output of the comparator 3 is passed through the hysteresis circuit 61 so as to have a hysteresis and is then chopped in the chopper circuit 63 by means of a clock (having a frequency generally selected to fall between 2 and 50 KHz) delivered from the oscillator 62. The chopper circuit 63 in this case is adapted to be able to variably set the duty ratio of each pulse of the pulse train output (referred to as "chopper signal" in this specification).

Figure 7A:
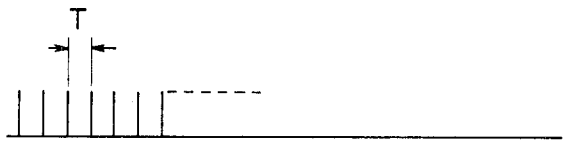
FIG. 7(a) to FIG. 7(d) are illustrations for the operation of the heater power controller shown in FIG. 5.
Figure 7B:
Figure 7C:

FIG. 6 shows the details of the chopper circuit 63 and its peripheral circuits. In this circuit portion, "0" and "1" clocks (FIG. 7(a)) from the oscillator 62 and "0" and "1" signals (FIG. 7(b)) from the hysteresis circuit 61 are received by an AND gate 21, and a monostable multivibrator 22 is energized by the output of the AND gate 21. The monostable multivibrator 22 thereby delivers such a signal as shown in FIG. 7(c). In this case, the pulse width t of the signal can be varied by regulating the resistance R of a resistor 221 which contributes to the CR time constant. More specifically, the duty ratio, t/T, of the output pulse can be regulated by varying the resistance R of the resistor 221.

Representing the duty ratio by $\alpha$, the power P supplied to the resistor 1 is expressed as follows:

$$P = 1/T \int_0^{\alpha T} (E^2/Rh)dt \quad (1)$$

$$= \alpha E^2/Rh$$

where
T: the period of the clock
E: the output voltage of the driver 2
Rh: the resistance value of the heater resistor 1

Figure 7D:
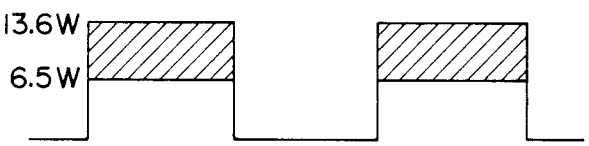

Assuming now that the heater resistor 1 is supplied with a constant power 6.5 W at E=24 V, when $\alpha=1$, Rh is about 90Ω; when $\alpha=0.225$, Rh is about 20Ω. Therefore, with respect to the variations in the resistance Rh between 20 and 90Ω, it is possible to realize the supply of a constant power of 6.5 W at all times by regulating the duty ratio $\alpha$ in a range between 22.5 and 100%. FIG. 7(d) shows the power consumption in the conventional heater power controller under the conditions where Rh=20Ω and the dummy resistance value is 22Ω. As will be obvious from the drawing, when the heater resistor 1 is supplied with a constant power of 6.5 W, the dummy resistor consumes a power (diagonal-line portion) of 7.1 W at the same time. However, the heater power controller of the invention has completely eliminated this power consumption of 7.1 W and hence can heat the heater resistor 1 with a high efficiency.

It is to be noted that the circuit for carrying out the invention is, as a matter of course, not limitative to that shown in FIG. 5. In addition, in the case where the clock from the oscillator is employed for driving also other principal power element, such as a piezo-electric element mounted for ejecting ink in the ink chamber from the nozzle, if the other power element and the heater resistor are coincident in driving timing with each other, the load on the power source becomes large. Therefore, a phase shifter may be connected at the rear of the oscillator in order to shift the phase of the clock for driving the heater resistor so that the heater resistor will be driven during the period that the other power element is not driven.

As has been described, according to the invention, the ON-OFF output of the comparator is converted into a DC chopper signal by means of the clock having a predetermined period, and the multivibrator is actuated according to the chopper signal to drive the heater resistor by means of the pulse output of the multivibrator. Therefore, with respect to the variations in the resistance value of the heater resistor, it is possible to supply easily a predetermined constant power at all times simply by regulating the duty ratio of the pulse output. Moreover, since there is no need for any dummy resistor large in dimension and high in cost which is required in the conventional heater power controller, the wasteful power consumed in the dummy resistor has been completely eliminated.

Specifically, according to the present invention, it is possible to cope with variations in resistance of the heater resistor by using a variable resistor much smaller in size than the dummy resistor, to reduce the wasteful heat losses and to make the printer economically.

Further, in the conventional controller a short circuiter is provided in parallel with the dummy resistor and operated in order to increase the power supplied to the heater in warming up at a low temperature for reducing the warm-up time, and a transistor or the like having a large current output is required to constitute the short circuiter. According to the controller of the invention, however, a maximum power can be readily supplied simply by setting the duty ratio to be 100%. Thus, the invention offers great advantages.

What is claimed is:
1. A heater power controller for an ink jet printer comprising
    a detecting means for detecting a temperature of an ink in a print head of the jet printer, said detecting means generating a detection signal corresponding to the temperature,
    a comparator for making a comparison between the detection signal and a reference signal,
    a chopping means for chopping an output signal of said comparator, whereby said output signal is converted into a chopper signal, and
    a regulating means for adjusting a duty ratio of said chopper signal according to characteristics of a heater for heating the ink,
    whereby said chopper signal is converted into a control signal.
2. A heater power controller for an ink jet printer according to claim 1, wherein the pulses constituting said chopper signal is different in phase with pulses supplied to other pulse-driven load.
3. The heater power controller of claim 1 wherein the heater has a wide variation of heat efficiency.

* * * * *